United States Patent [19]

Motohashi et al.

[11] Patent Number: 5,632,087
[45] Date of Patent: May 27, 1997

[54] RECIPROCATORY DRY SHAVER

[75] Inventors: Ryo Motohashi; Masao Tanahashi, both of Hikone; Rokusaburo Kimura, Kobe, all of Japan

[73] Assignee: Matsushita Electric Works, Ltd., Osaka, Japan

[21] Appl. No.: 413,201

[22] Filed: Mar. 28, 1995

[30] Foreign Application Priority Data

Mar. 28, 1994 [JP] Japan .................................. 6-057567
Mar. 28, 1994 [JP] Japan .................................. 6-057569

[51] Int. Cl.⁶ .................................................. B26B 19/02
[52] U.S. Cl. ........................................... 30/43.92; 30/43.9
[58] Field of Search ........................... 30/43.92, 43.9, 30/43.7, 43.8, 43.91; 318/119, 128

[56] References Cited

U.S. PATENT DOCUMENTS

| | | | |
|---|---|---|---|
| 3,218,708 | 11/1965 | Spohr | 30/43.92 |
| 3,243,615 | 3/1966 | Jepson et al. | 30/43.92 |
| 3,296,468 | 1/1967 | Townshend | 30/43.92 |
| 3,863,338 | 2/1975 | Wellinger et al. | 30/43.92 |
| 3,872,587 | 3/1975 | Wellinger | 30/43.92 |
| 3,898,732 | 8/1975 | Krainer | 30/43.92 |
| 4,583,027 | 4/1986 | Parker et al. . | |
| 4,719,698 | 1/1988 | Ninomiya et al. | 30/43.92 X |

FOREIGN PATENT DOCUMENTS

| | | |
|---|---|---|
| 0349077 | 1/1990 | European Pat. Off. . |
| 2179653 | 11/1973 | France . |
| 1151307 | 9/1960 | Germany . |
| 2236276 | 2/1973 | Germany . |
| 61-167174 | 10/1986 | Japan . |
| 62-23569 | 2/1987 | Japan . |
| 538387 | 2/1993 | Japan . |
| 2084408 | 4/1982 | United Kingdom . |

*Primary Examiner*—Hwei-Siu Payer
*Attorney, Agent, or Firm*—William A. Knoeller

[57] ABSTRACT

A reciprocatory dry shaver comprises a stationary cutter, a movable cutter, and a permanent-magnet linear motor having a stator and a reciprocator which is driven by an electric current to reciprocate relative to the stator. The reciprocator carries the movable cutter to reciprocate it in shearing engagement with the stationary cutter. A power circuit is included to provided an electric power to the motor. The shaver includes a detector which detects a displacement of the movable cutter and give an output indicative of the detected displacement of the movable cutter. Also included in the shaver is a controller which varies the electric power being fed to the motor in a feedback manner based upon the output from the speed detector in order to keep an oscillation amplitude of the movable cutter at constant. In this manner, the movable cutter can reciprocate without being jammed even when experiencing a heavy lead during the shaving, thereby avoiding undesired speed reduction of the movable cutter which would result in the lowering of the cutting efficiency. Thus, the reciprocatory dry shaver is capable of keeping a constant oscillation amplitude irrespective of a lead acting on a movable cutter to thereby assure a sharp cut even when the movable cutter experiences a heavy lead during the shaving.

24 Claims, 14 Drawing Sheets

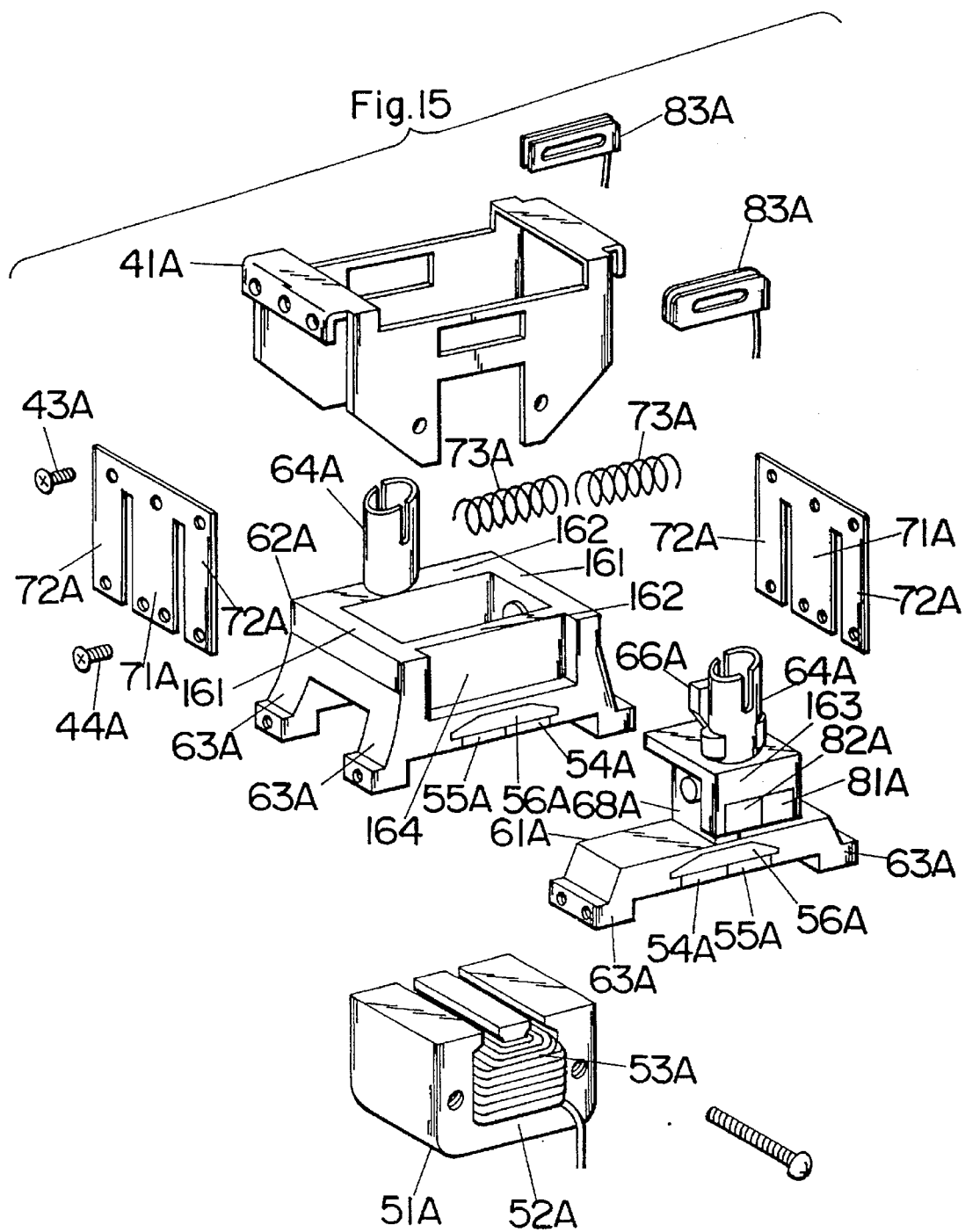

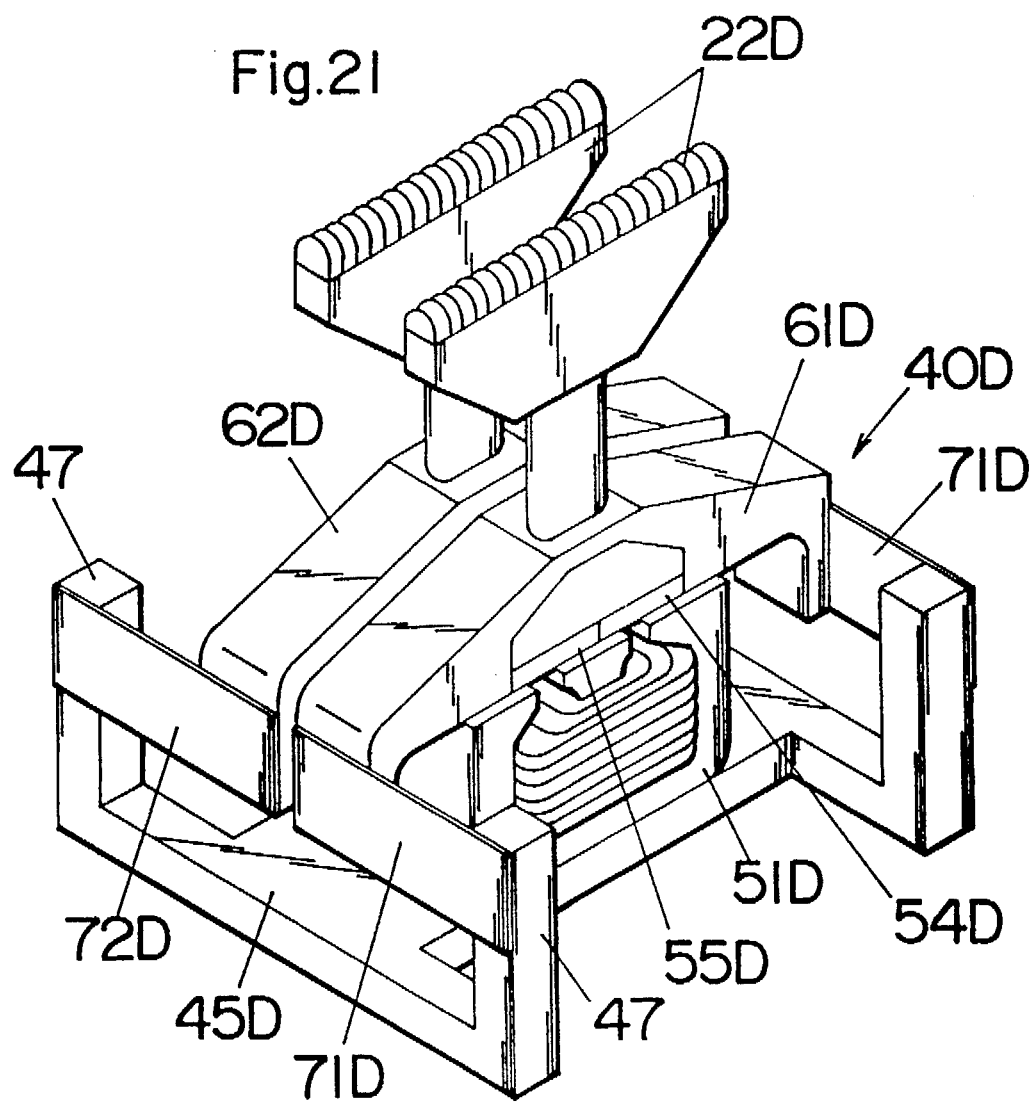

5,632,087

RECIPROCATORY DRY SHAVER

BACKGROUND OF THE INVENTION

1. Field of the Invention

The present invention is directed to a reciprocatory dry shaver having a movable cutter which is driven to reciprocate by a permanent magnet linear motor.

2. Description of the Prior Art

European Patent Publication EP 349077 discloses a reciprocatory dry shaver comprising a linear motor for reciprocating a movable critter in shearing engagement with a stationary cutter. The motor comprises an electromagnet as a stator and a permanent magnet as a reciprocator supporting a movable cutter. The electromagnet is energized by a current of a fixed frequency to drive the reciprocator and the movable cutter. When the movable cutter experiences a heavy load during the shaving, the movable cutter moves only by a slight stroke, which reduces an oscillation amplitude with an attendant decrease in the speed of the movable cutter, thereby reducing cutting sharpness and even failing to cut the hairs. There have been also known in the art reciprocatory shavers with a feedback control of a motor, as disclosed in Japanese Patent Early Publication No. 5-38387, Japanese Utility Model Early Publication No. 62-23569, and Japanese Utility Model Early Publication No. 61-167174. The shavers of these prior art includes a rotary motor and a reciprocator carrying a movable cutter. The reciprocator is coupled to the rotary motor through a rotary-to-reciprocation conversion mechanism so as to be driven by the motor to reciprocate. A detector is provided in the shavers to detect a motor current, motor speed, or speed of the reciprocator to give a corresponding output which is processed in a feedback manner to vary the motor output in an attempt to keep a constant amplitude of oscillation. However, due to the inclusion of the rotary-to-reciprocation conversion mechanism in which energy loss is inherent, there is always response delay in the feedback control. Because of difficulty of effecting quick control, the movable cutter encountering a heavy lead during the shaving can be driven to move with a stronger force than earlier only after some delay, thus failing to achieve an immediate sharp cut.

SUMMARY OF THE INVENTION

The above problem has been eliminated in the present invention which provides a reciprocatory dry shaver capable of keeping a constant oscillation amplitude irrespective of a lead acting on a movable cutter. The reciprocatory dry shaver in accordance with the present invention comprises a stationary cutter, a movable cutter, and a permanent-magnet linear motor having a stator and a reciprocator which is driven by an electric current to reciprocate relative to the staler. The reciprocator carries the movable cutter to reciprocate it in shearing engagement with the stationary cutter. A power circuit is included to provided an electric power to the motor. The shaver includes a detector which detects a displacement of the movable cutter and give an output indicative of the detected displacement of the movable cutter. Also included in the shaver is a controller which varies the electric power being fed to the motor in a feedback manner based upon the output from the speed detector in order to keep an oscillation amplitude of the movable cutter at constant. In this manner, the movable cutter can reciprocate without being jammed even when experiencing a heavy load during the shaving, thereby avoiding undesired speed reduction of the movable cutter which would result in the lowering of the cutting efficiency.

Accordingly, it is a primary object of the present invention to provide a reciprocatory dry shaver which is capable of assuring a sharp cut even when the movable cutter experiences a heavy load during the shaving.

The detector is preferably a speed detector which detects a speed of the movable cutter as representative of the displacement thereof and which is configured to give the output in each half cycle of the oscillation of the reciprocating movable cutter so that the controller responds to the output for varying the electric power being fed to the motor in each half cycle. Therefore, a precise and quick control can be made to avoid unintended speed reduction in each half cycle of the movable cutter reciprocation.

These and still other objects and advantageous features will become more apparent from the following detailed description of the embodiments when taken in conjunction with the attached drawings.

BRIEF DESCRIPTION OF THE DRAWINGS

FIG. 15 is an exploded perspective view of a cutter block utilized in the shaver of FIG. 13;

FIG 21 is a perspective view of a cutter block utilized in a dry shaver in accordance with a fifth embodiment of the present invention.

DETAILED DESCRIPTION OF THE PREFERRED EMBODIMENTS

Figure 1:
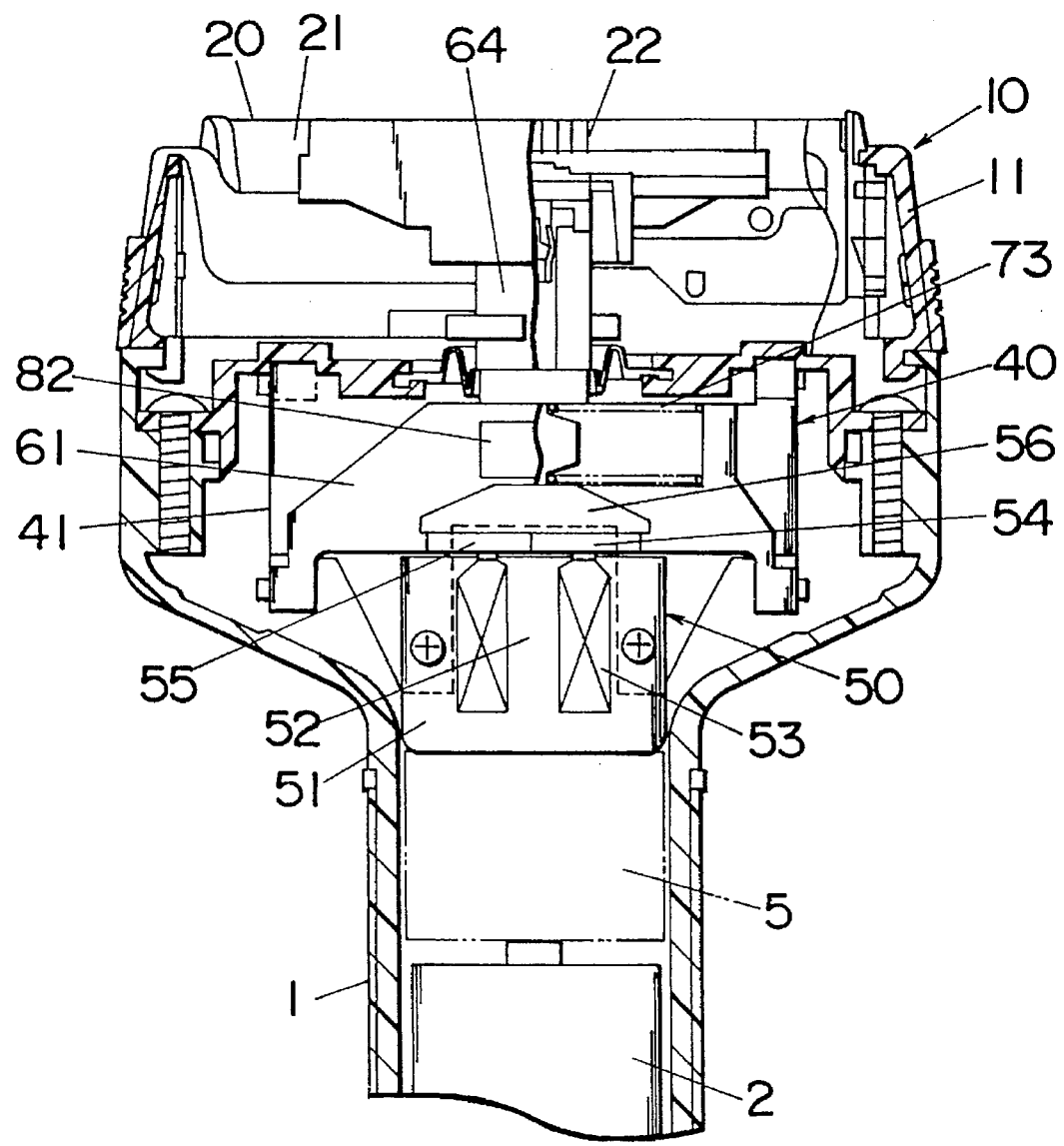
FIG. 1 is a flout sectional view illustrating a principal portion of a reciprocatory dry shaver in accordance with a first embodiment of the present invention.

First Embodiment < FIGS. 1 to 12>

Referring now to FIGS. 1 to 5, there is shown a reciprocatory dry shaver in accordance with a first embodiment of the present invention. The shaver has a housing 1 with a shaver head 10 provided with two outer cutter heads 20 and one center cutter head 30 extending to horizontally in parallel to the outer cutter heads 20. The outer cutter head 20 comprises a stationary cutter 21 in the form of a shearing foil of a generally U-shaped cross section and a movable cutter 22 driven to reciprocate in shearing engagement with the stationary cutter 21. The stationary cutter 21 is mounted on a head frame 11 detachably mounted on the housing 1, while the movable cutter 22 is mounted on a cutter block 40 disposed within the housing 1. The center cutter head 30 comprises a narrow toothed cutter 31 of a generally U-shaped configuration and a movable blade 32 driven to reciprocate in shearing engagement with the cutter 31. The cutter 31 is mounted on the head frame 11, while the blade 32 is mounted on the cutter block 40 to move together with one of the movable cutters 22.

Figure 3:
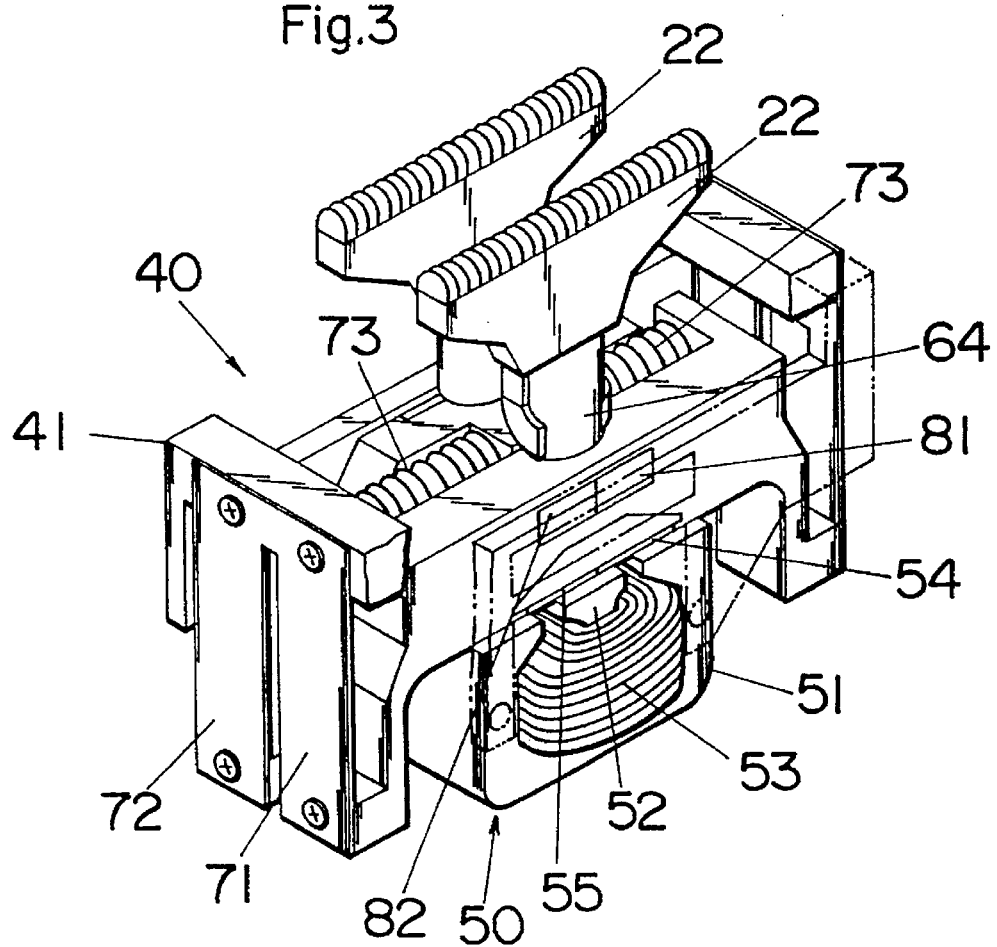
FIG. 3 is a perspective view of a cutter block including a motor utilized in the above shaver.
Figure 4:
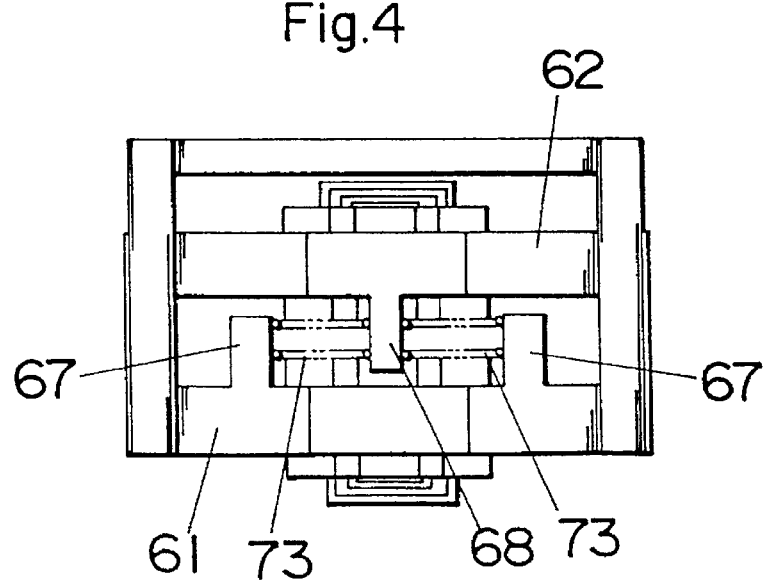
FIG. 4 is a top view of the cutter block with movable cutters removed.
Figure 5:
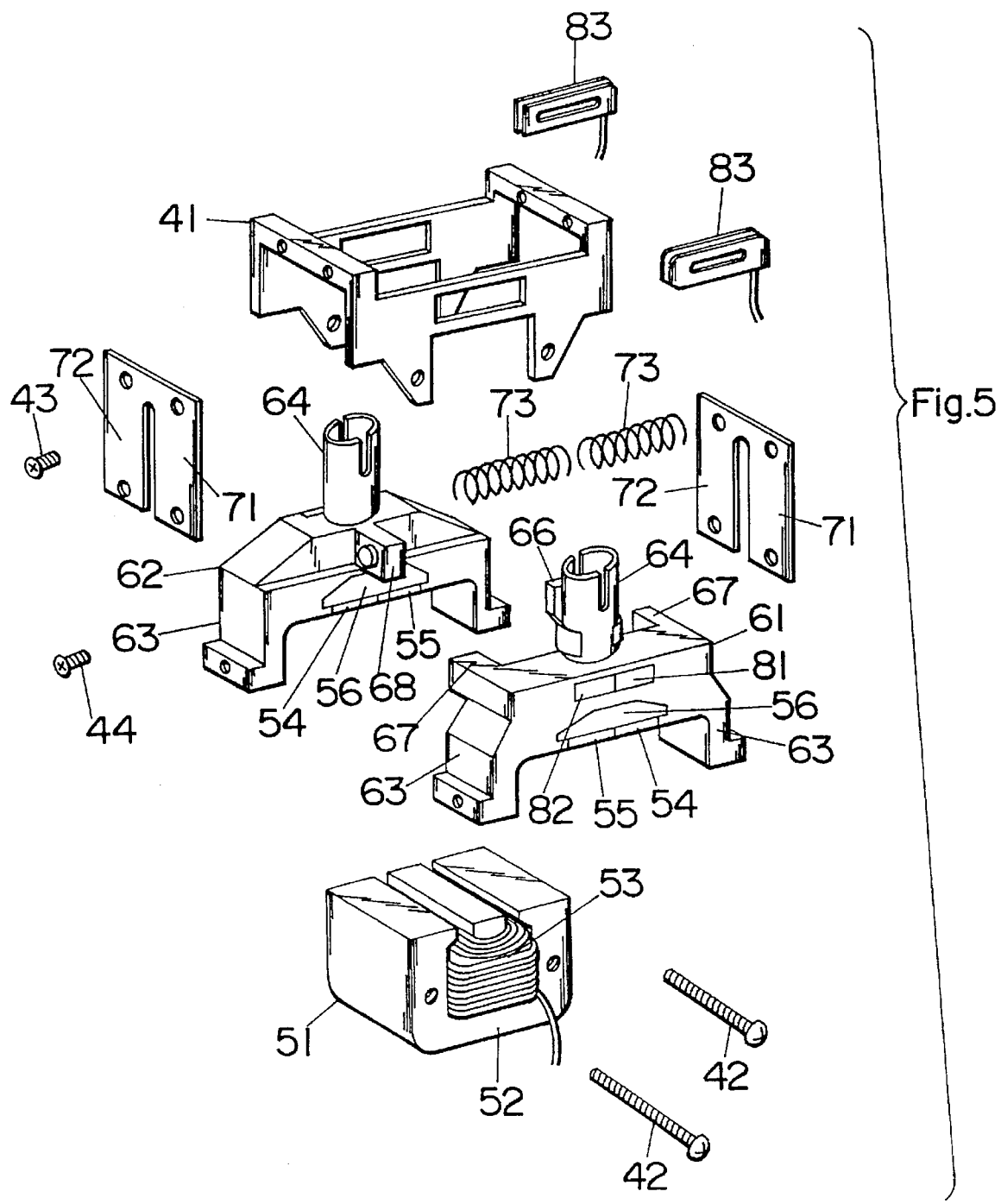
FIG. 5 is an exploded perspective view of the cutter block.
Figure 6:
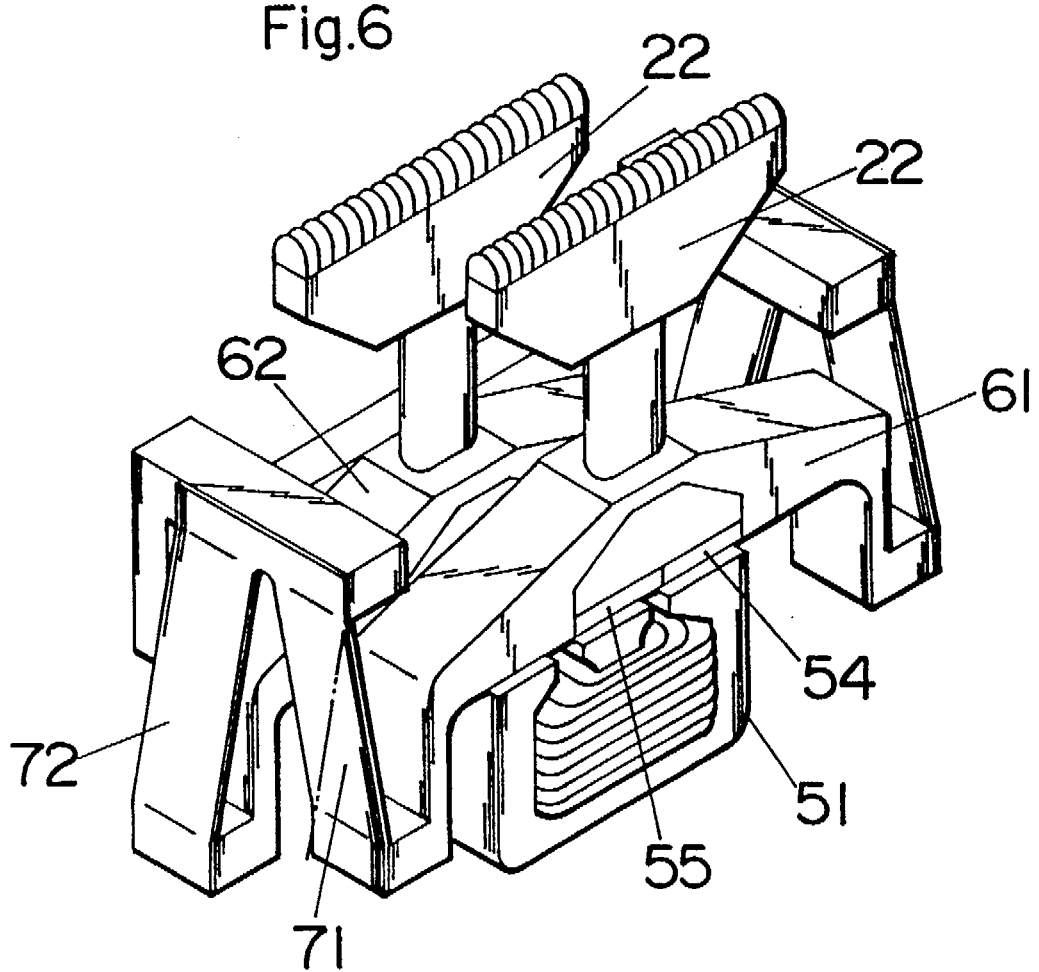
FIG. 6 is a perspective view illustrating the movement of reciprocators utilized in the above shaver.

As shown in FIGS. 3 and 5, the cutter block 40 comprises a chassis 41 which supports a permanent magnet linear motor 50. The motor 50 comprises a single electromagnet 51 as a stator and a pair of reciprocators 61 and 62 each having a set of permanent magnets 54 and 55. The electromagnet 51 comprises a E-shaped core 52 and a winding 53 which is energized by an alternating current to magnetize three pole ends of the core to opposite polarity. The current is supplied from a battery 2 through a controller 100 in a control box 5 accommodated within the housing 1. The permanent magnets 54 and 55 are embedded side-by-side in the center bottom of each of the reciprocators 61 and 62 together with a yoke 56, and are magnetized in the direction perpendicular to the length of the reciprocator to have opposite poles on the lower ends of the magnets 54 and 55. The electromagnet 51 is secured to the lower end of the chassis 41 by means of screws 42 with the three pole ends facing upward. The reciprocator 61 and 62 are suspended from the chassis 41 by means of leaf springs 71 and 72 so that they are movable relative to the chassis 41 and the electromagnet 51. The leaf spring 71 and 72 are integrated at their upper ends where they are fixed to the chassis 41 by screws 43. The lower ends of the leaf springs 71 and 72 are fixed respectively by screws 44 to the lower end of opposed side legs 63 depending from opposite lengthwise ends of the reciprocator 61,62. Thus, the reciprocators 61 and 62 are allowed to move only along the lengthwise direction thereof relative to the electromagnet 51, as shown in FIG. 6, while maintaining substantially a constant gap between the permanent magnets 54 and 55 and the pole ends of the electromagnet 51. The bottom of the reciprocators in which the permanent magnets 54 and 55 are embedded is kept in an out of contact relation to tile pole ends of the electromagnet 51 for smoothly driving the reciprocators with a minimum energy loss. The permanent magnets 54 and 55 in the one reciprocator 61 is arranged oppositely to those in the other reciprocator 62 so that the reciprocators 61 and 62 are driven to reciprocate in opposite directions for achieving a dynamic blanching of the reciprocating movement. It is noted here that the reciprocators 61 and 62 are secured at their lower ends of the legs 63 to the leaf springs 71 and 72 at an elevation lower than the upper pole ends of the electromagnet 51 to receive the upper portion of the electromagnet in a recess formed between the legs 63 for reducing a height dimension of the cutter block 40.

Figure 2:
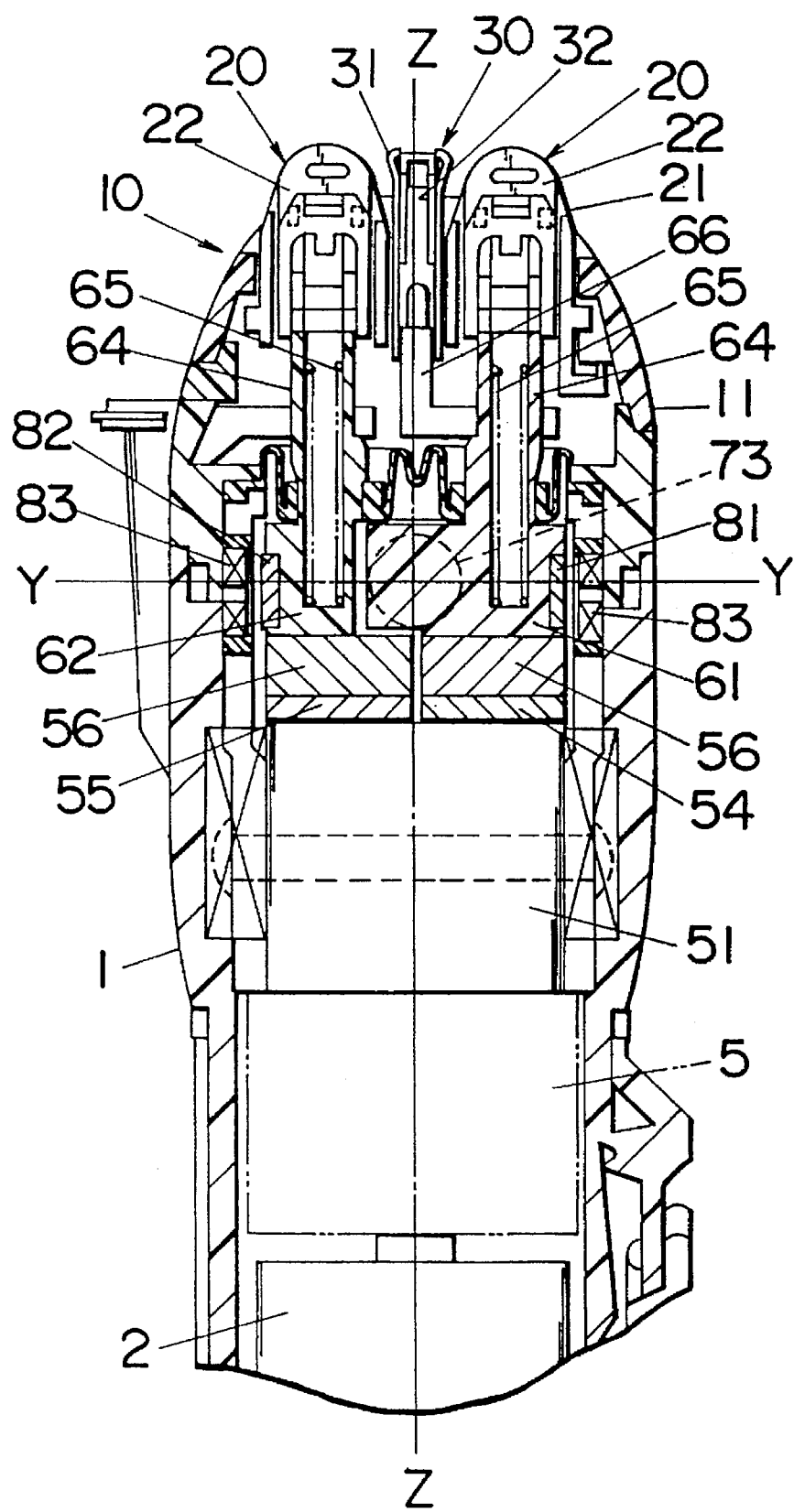
FIG. 2 is a side sectional view of the above shaver.

Projecting from the lengthwise center of the reciprocators 61 and 62 are joints 64 respectively for connection with the movable cutters 22 of the outer cutter head 20. As shown in FIG. 2, the joint 64 accommodates a spring 65 which urges the movable cutter 22 against the stationary cutter 21 of the outer cutter head 20. The joint 64 of the reciprocator 61 is additionally formed with a member 66 which is connected to drive the movable blade 32 of the center cutter head 30. Tile reciprocator 61 is formed with a pair of end posts 67 projecting from the opposed lengthwise ends of the reciprocator 61 toward the adjacent reciprocator 62, while the reciprocator 62 is formed with a center post 68 projecting towards the adjacent reciprocator 61.

Interposed between the center post 68 and the end posts 67 are coil springs 73 which are cooperative with the corresponding leaf spring 71,72 and a horizontal component of magnetic compliance of the motor to provide oscillation systems for the reciprocators 61 and 62 having natural frequency. That is, the coil springs 73 are cooperative with the corresponding leaf springs 71 and 72 as well as the horizontal component of the magnetic compliance to give force constant $K_1$ and $K_2$ to the individual oscillation systems of the reciprocators 61 and 62 having respective masses $M_1$ and $M_2$. In this embodiment, the oscillation system of the reciprocator 61 has force constant $K_1$ which is determined in the following equation.

$$K_1 = Kb_1 + Km_1 + 4kc$$

wherein $Kb_1$ is a spring constant of the leaf spring 71;

$Km_1$ is a horizontal component of a spring constant of the motor;

$K_c$ is a spring constant of the single coil spring 73.

Likewise, the oscillation system of the reciprocator 62 has spring constant $K_2$ which is determined in the following equation.

$$K_2 = Kb_2 + Km_2 + 4Kc$$

wherein $Kb_2$ is a spring constant of the leaf spring 72;

$Km_2$ is a horizontal component of a spring constant of the motor;

$K_c$ is a spring constant of the single coil spring 73.

In this embodiment, the ratio $K_1/M_1$ is made approximately equal to $K_2/M_2$, where $M_1$ and $M_2$ represent mass of the individual oscillation systems, that is, $M_1$ is a total mass of reciprocator 61, joint 64, member 66, movable cutter 22, and movable blade 32, and $M_2$ is a total mass of reciprocator 62, joint 64, and movable cutter 22. Because of the relation $K_1/M_1 = K_2/M_2$, the two oscillation system have substantially the same natural frequency $$f = \frac{1}{2\pi} \cdot \sqrt{\frac{K}{M}},$$

Whereby reducing unbalanced vibrations applied to the shaver head.

Since the two reciprocators 61 and 62 are coupled by way of the springs 73, when one of the reciprocators encounters a heavy load to thereby reduce its speed, the other reciprocator free from such heavy load can transfer its kinetic energy to the one reciprocator through the springs 73 such that the one reciprocator can be given the constant oscillation amplitude, whereby enabling the two reciprocators to effect balanced oscillation. In this embodiment, the coil springs 73 are disposed in a width center of the cutter block 40 as well as the shaver and aligned on a longitudinal axis extending in a plane Z—Z including the width center, as shown in FIG. 2. Therefore, it is made to lessen a couple developing about the center of the cutter block 40, thereby reducing undesired vibrations. Further, the coil springs 73 are disposed at an elevation Y—Y where a mass center of the cutter block 40 lies, whereby reducing a couple developing about a longitudinal axis passing in a horizontal plane including the mass center of the cutter block 40.

Embedded in the lengthwise center of each reciprocators 61 and 62 is a set of permanent magnets 81 and 82 aligned along the lengthwise direction of the reciprocator in a juxtaposed relation to a coil sensor 83 fitted in the chassis 41. The magnets 81 and 82 are magnetized in the direction perpendicular to the length of the reciprocators and are so arranged to have opposite poles appearing on the exterior of the reciprocator. As the reciprocator 61, 62 reciprocates, the permanent magnets 81 and 82 move toward and away from the coil sensor 83 to thereby induce a sinusoidal voltage at the coil sensor 83 which is proportional to the speed of the reciprocator and is also indicative of the moving direction of the reciprocator. Since the coil sensor 83 is fitted within the wall of the chassis 41, the sensor can be added without requiring additional width dimension to the shaver head.

Figure 7:
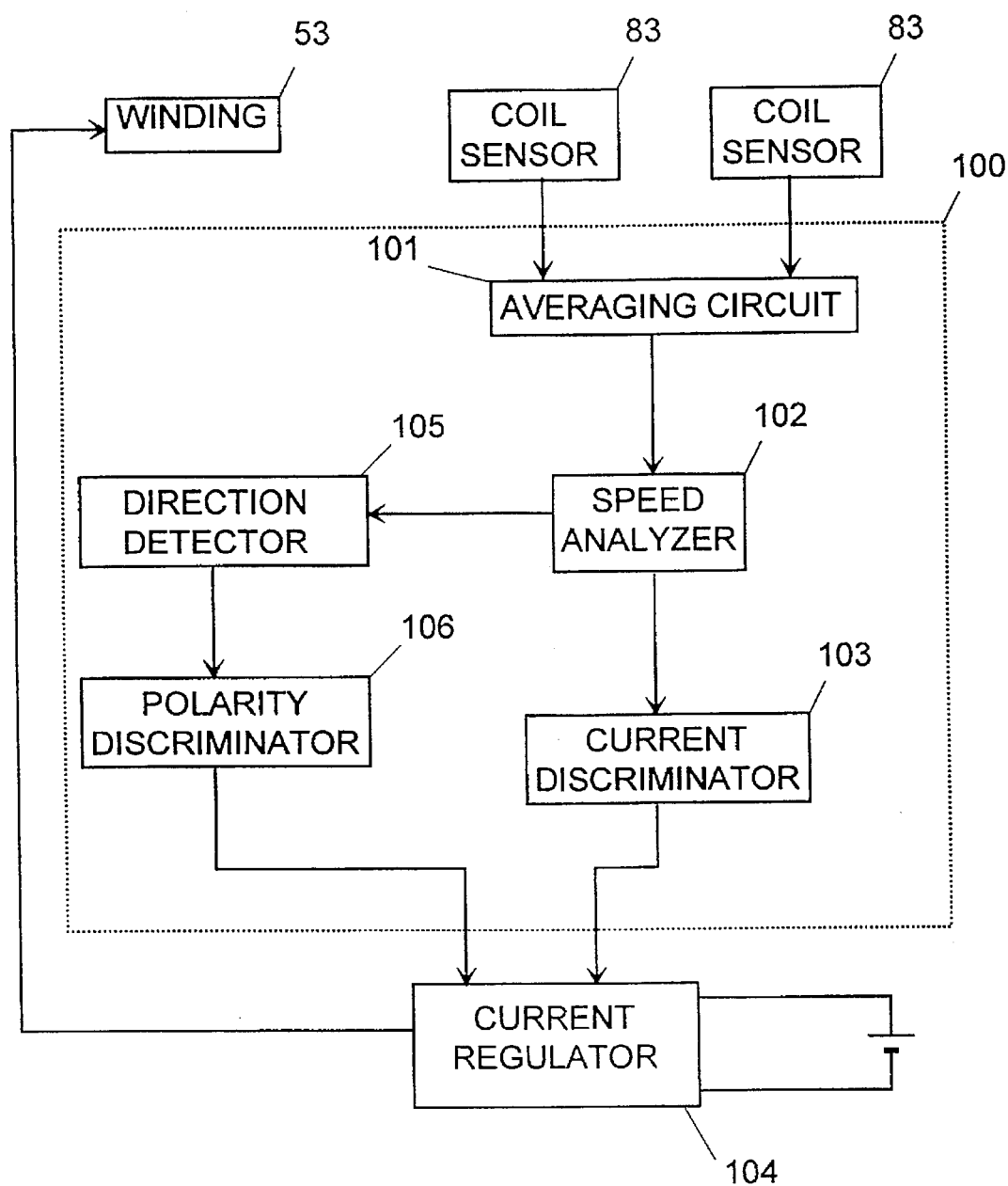
FIG. 7 is a block diagram illustrating the operation of a controller in the shaver.

FIG. 7 illustrates a circuit of the controller 100 which comprises an averaging circuit 101 receiving the outputs of the two coil sensors 83 to provide an averaged output indicative of an average speed of the reciprocators 61 and 62, i.e., movable cutters 22. The averaged output is fed to a speed analyzer 102 where it is processed to give a speed signal indicating an averaged speed at a particular timing, as will be discussed later. The signal from the speed analyzer 102 is fed to a current discriminator 103 which responds to give a current signal to a current regulator 104 for varying the power being fed to the winding 53 of the motor. Also included in the controller 100 is a direction detector 105 which derives a direction signal from the speed analyzer 102 indicating the direction in which the reciprocator 61 or 62 moves. Based upon the direction signal a polarity discriminator 106 gives a signal which causes the current regulator 104 to feed the current of such a polarity as to generate a driving force to the oscillating system for keeping or accelerating the motion of the reciprocator.

Figure 8:
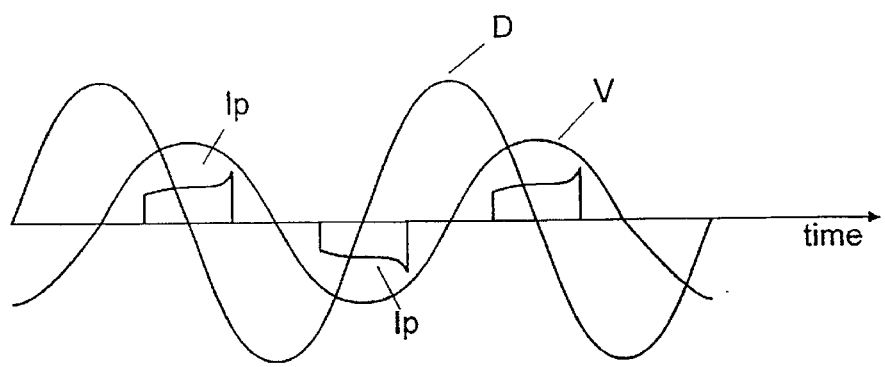
FIGS. 8 and 9 are waveform charts illustrating the operation of the controller, respectively.
Figure 9:
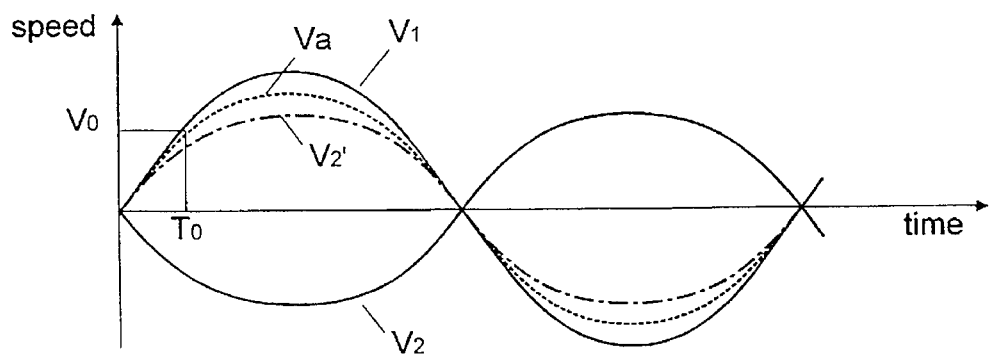
Figure 10:
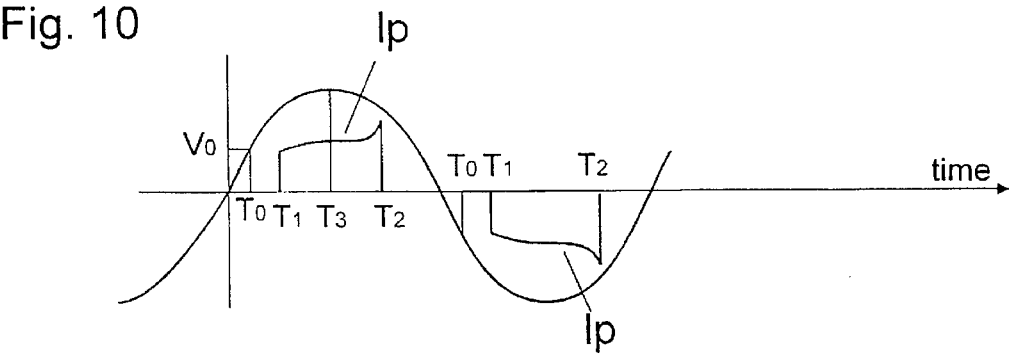
FIG. 10 is a waveform chart illustrating a scheme of varying an electric energy supplied to the motor.

As shown in FIG. 8, the output voltage V of the coil sensor 83 is a sinusoidal wave which is 90° out of phase relation to the displacement D of the reciprocator. The current supplied to the winding 53 is in the form of an alternating pulse Ip which appears during a period in which the reciprocator reaches its maximum speed so as to produce the driving force of keeping the oscillation. When the detected speed becomes lower than a predetermined level as a result of that the movable cutter 22 and/or movable blade 32 encounters a heavy lead during the shaving, the controller 100 responds to increase the amount of the current supplied and therefore to increase the speed of the reciprocator in order to keep a constant oscillation amplitude of the reciprocator, thereby maintaining an intended sharp cut. In this embodiment, the speed detection is made at a timing To shortly after the speed of reciprocator increases from zero but before reaching its maximum, as shown in FIG. 9, to give a detected voltage V0. The speed voltages $V_1$ and $V_2$ of the two reciprocators are processed at the averaging circuit 101 of the controller 100 to give an average speed voltage $V_a$ by reversing the one speed voltage ($V_2 \rightarrow V_2'$) in a manner as shown in the figure. In this instance, therefore, the voltage $V_0$ at time $T_0$ is utilized to compare with the predetermined level. The amount of the current is controlled to vary by a pulse width or a period in which the current is fed to the motor. As shown in FIG. 10, the pulse Ip begins at a fixed time $T_1$ shortly after $T_0$ and ends at a variable time $T_2$. It is noted that time $T_1$ and $T_2$ is selected such that the pulse width includes a time $T_3$ where the reciprocator reaches its maximum speed. This scheme of applying a driving force when the reciprocator is around reaching its maximum speed, only minimum external energy is required for the oscillation system to maintain the oscillation of the reciprocator, which increases energy transmission efficiency.

Figure 11:
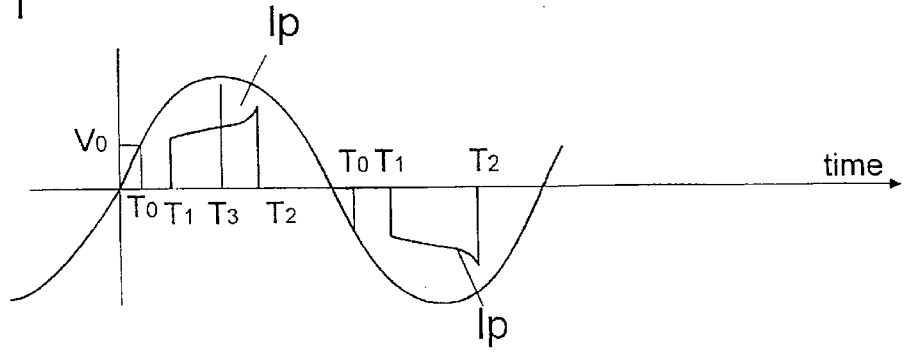
FIG. 11 is a waveform chart illustrating an alternative scheme of varying the electric energy supplied to the motor.

Alternately, the control of maintaining the constant oscillation amplitude of the reciprocator may be made by varying the current level during the fixed time period ($T_1$–$T_2$), as shown in FIG. 11. That is, when speed voltage $V_0$ at time $T_0$ is detected to be lower than the predetermined level, control is made to increase the level of the pulse current during the fixed time period ($T_1$–$T_2$). It should be noted in this connection that the speed detection is made in each half cycle of the oscillation of the reciprocator so as to control the power being fed to the motor in the subsequent half cycle with regard to the schemes of FIGS. 10 and 11. With this consequence, a control is made to immediately increase the speed of the reciprocator so that the movable cutter can travel over the full distance determined by the oscillation amplitude even if the movable cutter encounters a heavy load during the shaving, whereby keeping a desired sharp cut. Although in this embodiment, the speed is detected as representative of the oscillation amplitude, the amplitude or displacement of the reciprocator may be directly detected and processed for the feedback control.

Figure 12:
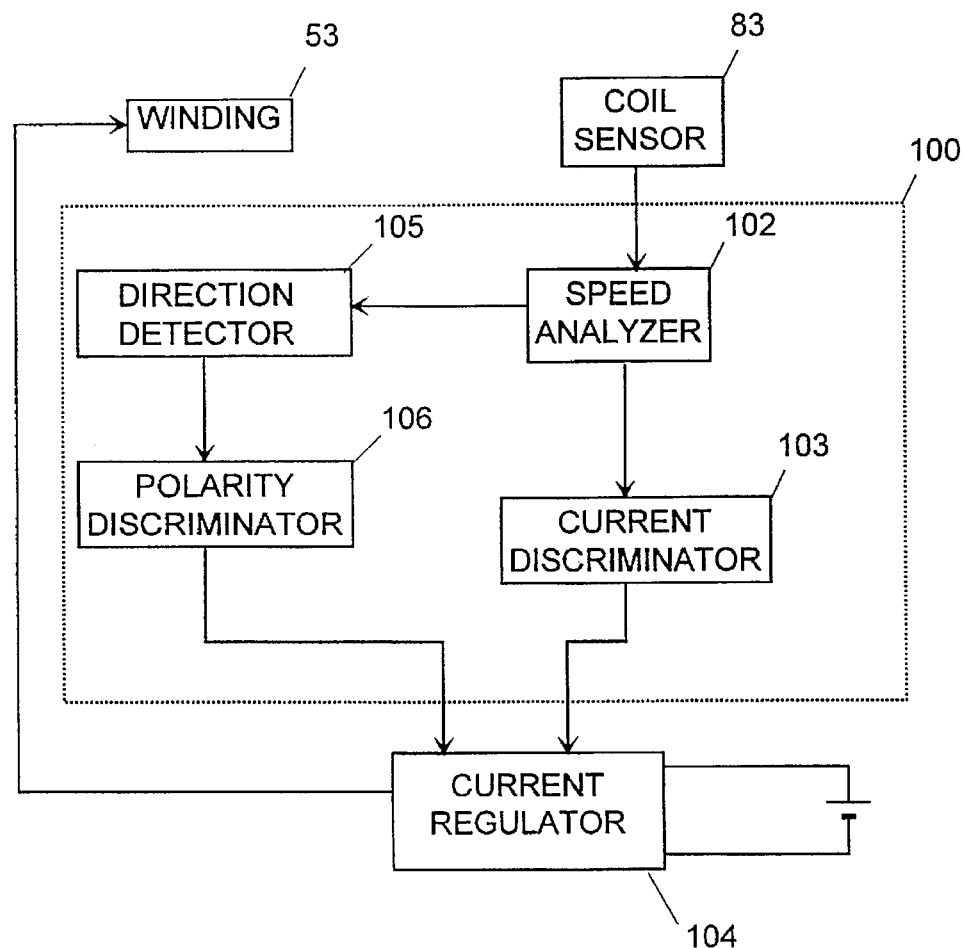
FIG. 12 is a block diagram illustrating the operation of a modified controller utilized in the shaver.

In the above embodiment, the coil sensor 83 and the associated magnets 81 and 82 are provided to detect the individual speeds of the two reciprocators 61 and 62 and the detected speeds are averaged to give an average speed as a basis for controlling to keep the constant oscillation amplitude. However, it is equally possible to use a single coil sensor 83 for detection of the one reciprocator and to effect the control based upon the speed detected for the one reciprocator, as shown in FIG. 12. Further, it is possible to drive the reciprocators 61 and 62 in the same direction by arranging the permanent magnets 54 and 55 in the same polarity order for both of the reciprocators 61 and 62.

Although in the above embodiment, the coil sensor is utilized to detect a speed of the reciprocator, i.e., the movable cuter, other types of sensor such as a Hall-effect device may be equally utilized. The Hall-effect device is cooperative with the permanent magnet on the reciprocator to produce a voltage indicative of the speed of the reciprocator. Further, instead of detecting the speed of the reciprocator, a displacement of the reciprocator itself may be detected for feedback control of varying electric power being fed to the motor. For this purpose, a proximity sensor such as a photo-sensor may be utilized to monitor a reflected light from the reciprocator to detect the displacement of the reciprocator. The detected displacement may be directly utilized for the feedback control or differentiated to give the speed of the reciprocator which is processed in a manner as shown in FIGS. 7 or 12. Further, an acceleration sensor may be utilized to provide an acceleration of the reciprocator which is integrated to give the speed of the reciprocator. Anyone of the above sensors requires no mechanical connection between the reciprocator and the chassis or the like member carrying the sensor.

Second Embodiment < FIGS. 13 to 16>

Figure 16:
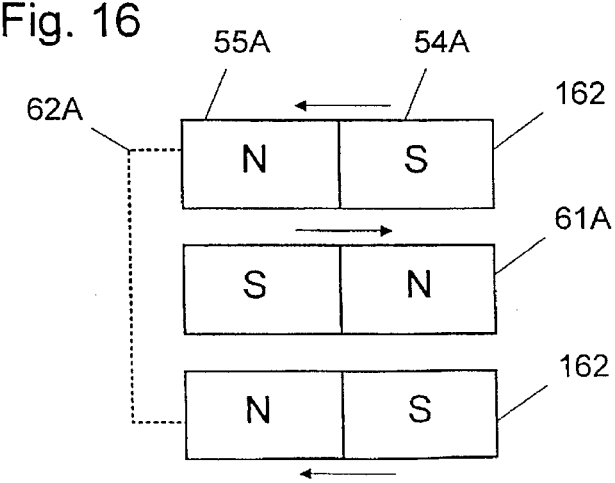
FIG. 16 is a schematic view illustrating the arrangement of magnets of a motor utilized in the above shaver.
Figure 13:
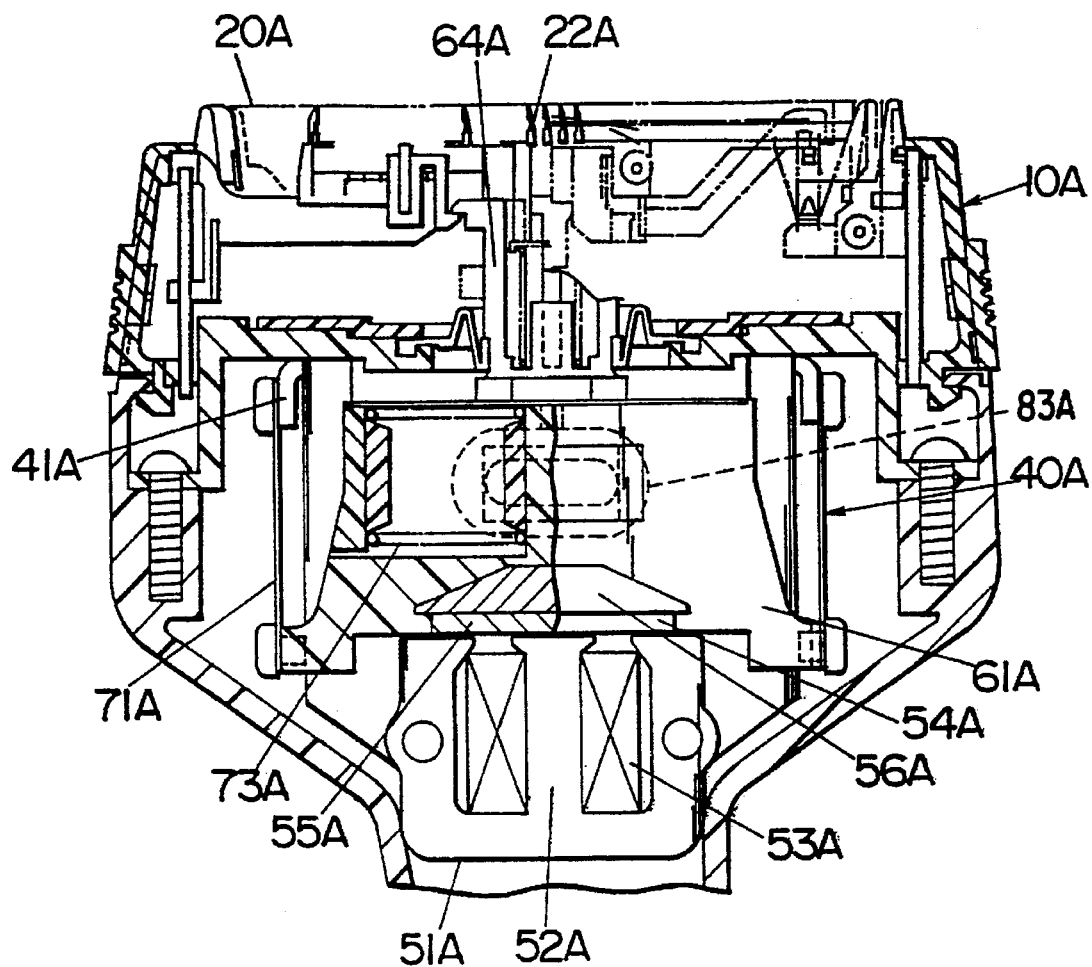
FIG. 13 is a front sectional view of a reciprocatory shaver in accordance. is with a second embodiment of the present invention.
Figure 14:
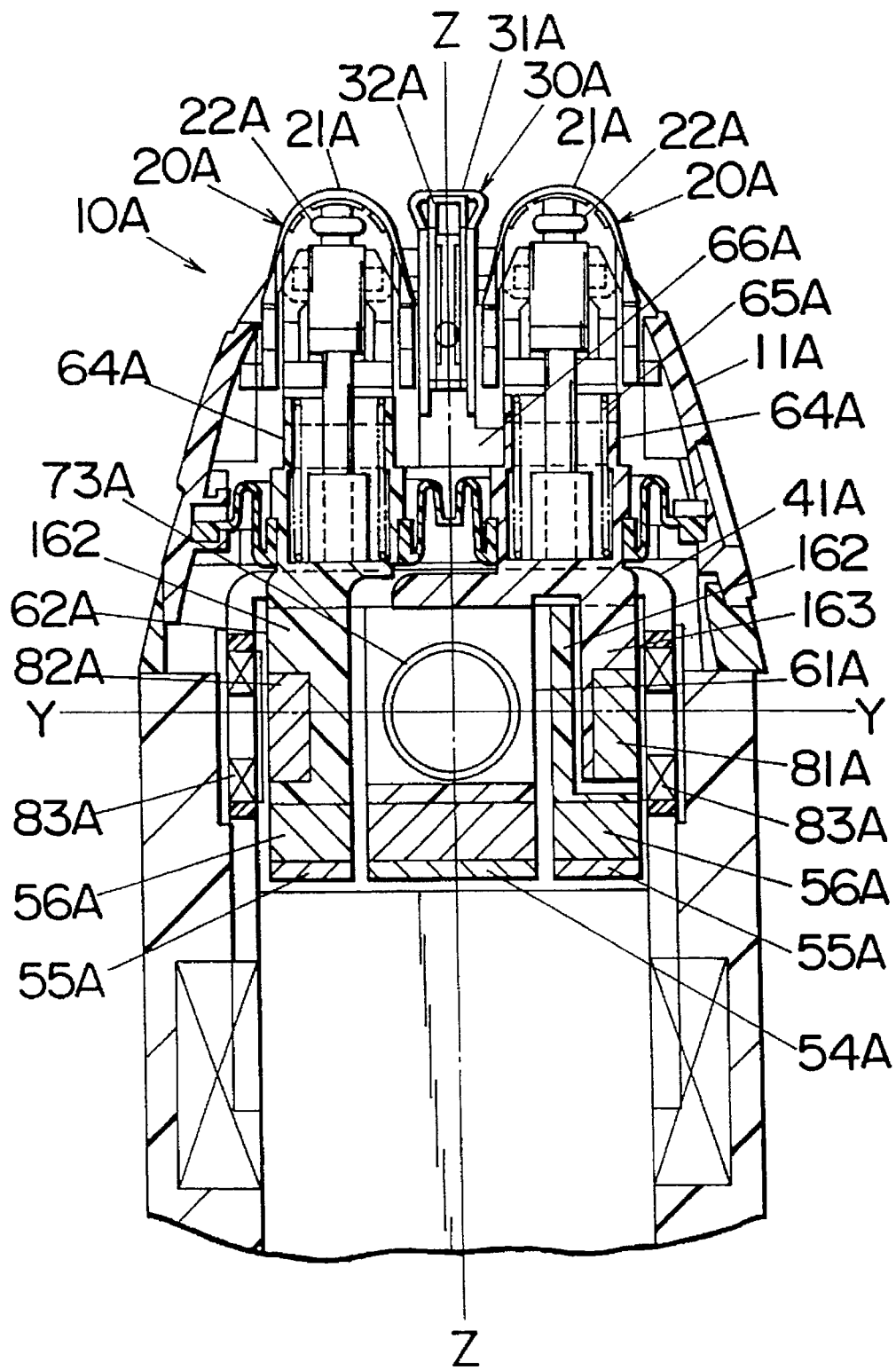
FIG. 14 is a side sectional view of the shaver of FIG. 13.

FIGS. 13 to 16 illustrates a dry shaver in accordance with a second embodiment of the present invention which is similar to the first embodiment except for the use of differently shaped reciprocators 61A and 62A. Like parts are designated by like numerals with a suffix letter of "A" and no duplicate explanation is made here. The reciprocator 62A is in the form of a rectangular frame comprises two parallel elements 162 connected by end bars 161, while the reciprocator 61A comprises a single elongated element disposed between the elements 162. Projecting from one element 162 of the reciprocator 62A is a joint 64A for mounting the movable cutter 22A of the corresponding outer cutter head 20A. The other reciprocator 61A has a joint 64A which projects on a center post 68A for coupling with the movable cutter 22A of the remaining outer cutter head 20A. The joint 64A on the reciprocator 61A is additionally formed with a member 66A for coupling with the movable blade 32A of the center cutter head 30A. Each of the elements 162 and the reciprocator 61A is provided with permanent magnets 54A and 55A which are embedded in the center bottom of the element and the reciprocator 61A. The magnets 54A and 55A are magnetized in the direction perpendicular to the length of the elements and the reciprocator and are oppositely magnetized to have opposite poles appearing on the lower end of each of the elements 162 and the reciprocator 61A. The magnets 54A and 55A of the reciprocators 61A and 62A are coupled through yokes 56A of a magnetic material also embedded in the reciprocators, respectively. As shown in FIG. 16, the magnets 54A and 55A of the center reciprocator 61A have their poles S and N oppositely arranged with respect to the two adjacent sets of the magnets 55A and 54A of the elements 162 of the reciprocators 62A in order to reciprocate the reciprocators 61A and 62A in the opposite direction. With this arrangement of the magnets, the magnetic attractive force acting on the center reciprocator 61A in the direction perpendicular to the reciprocating motion thereof from the laterally spaced magnets can be canceled out to assure smooth movement of the reciprocators.

The reciprocators 61A and 62A are suspended by means of leaf springs 71A and 72A from the chassis 41A to be movable in the lengthwise direction of the element relative to the electromagnet 51A while forming substantially a constant gap between the bottom of the reciprocators and the upper pole ends of the electromagnet 51A. Also in this embodiment, legs 63A depends from the opposite lengthwise ends of the element 162 and the reciprocator 61A and are fastened to the lower ends of the leaf springs 72A and 71A respectively by screws 44A at an elevation lower than the upper pole end of the electromagnet 51A such that the upper portion of the electromagnet 51A is received in a recess between the legs 63A. Coil springs 73A are interposed between the center post 68A of the reciprocator 61A and the end bars 161 of the reciprocator 62A so as to provide corresponding spring constant which are additive to the spring constant of the leaf springs 71A and 72A and that of the motor to determine force constants $K_1$ and $K_2$ for the individual oscillating systems having masses $M_1$ and $M_2$, wherein $$K_1 = Kb_1 + Km_1 + 4Kc \text{ and } K_2 = 2Kb_2 + 2Km_2 + 4Kc$$

$Kb_1$ is a spring constant of the leaf spring 71A;
$Km_1$ is a horizontal component of a spring constant of the motor;
$K_c$ is a spring constant of the single coil spring 73A;
$Kb_2$ is a spring constant of the leaf spring 72A;
$Km_2$ is a horizontal component of a spring constant of the motor;
$K_c$ is a spring constant of the single coil spring 73A;

$M_1$ is a total mass of reciprocator 61A, joint 64A, member 66A,
movable cutter 22A, and movable blade 32A, and
$M_2$ is a total mass of reciprocator 62A, joint 64A, and movable cutter 22A.

Formed on the reciprocator 61A is a flap 163 which depends from the upper end of the center post 68A for carrying a pair of permanent magnets 81A and 82A which are aligned along the lengthwise direction of the reciprocator in a juxtaposed relation to a coil sensor 83A fitted in the chassis 41A. The magnets 81A and 82A are magnetized in the direction perpendicular to the length of the reciprocators and are so arranged to have opposite poles appearing on the exterior of the reciprocator. The same set of magnets 81A and 82A is embedded in one element 162 of the reciprocator 62A in a juxtaposed relation to the like coil sensor 83A fitted in the chassis 41A. The flap 163 is received in a cavity 164 in one element 162 of the reciprocator 62A.

The feedback control of the motor is made in the same manner as in the first embodiment. Also in this embodiment, the relation $K_1/M_1 = K_2/M_2$ is satisfied for giving the equal natural frequency to the two oscillating systems. In order to satisfy the above relation, it is made to differentiate the magnetic strength acting on the respective reciprocators from the electromagnet. One example is to differentiate the strength of the permanent magnets, such as by utilizing the magnets of different magnetic flux density or the magnets of different volume. Alternately, the magnetic strength may be differentiated by utilizing the yokes 56A of different permeability or utilizing the yokes of different dimensions. Further, it is possible to differentiate the gap for the reciprocators 61A from the gap for the reciprocator 62A. In addition, it is effective to equal the masses $M_1$ and $M_2$ for the two oscillating systems in order to satisfy the above relation $K_1/M_1 = K_2/M_2$.

In the present embodiment, the reciprocator 61A is disposed in a width center of the cutter block 40A as well as the shaver head 10A to reciprocate in a vertical plane passing through the width center, and the coil springs 73A are aligned in the same vertical plane on opposite of the center post 68A of the reciprocator 61A. With this result, it is made to lessen a couple developing about the reciprocator 61A, thereby reducing undesired vibrations. Further, the coil springs 73A are disposed at an elevation where a mass center of the cutter block 40A lies, whereby reducing a couple developing about a lengthwise axis passing in a horizontal plane including the mass center of the cutter block 40A.

Figure 17:
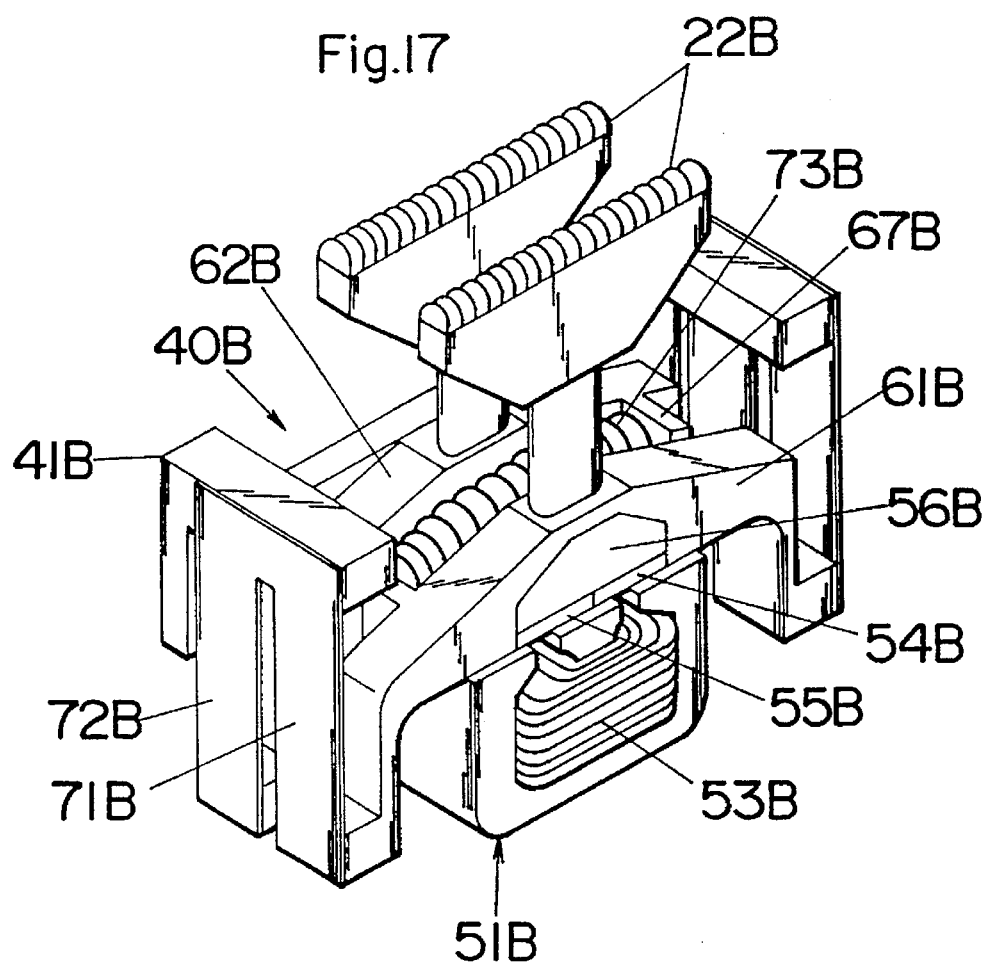
FIG. 17 is a perspective view of a cutter block utilized in a dry shaver in accordance with a third embodiment of the present invention.
Figure 18:
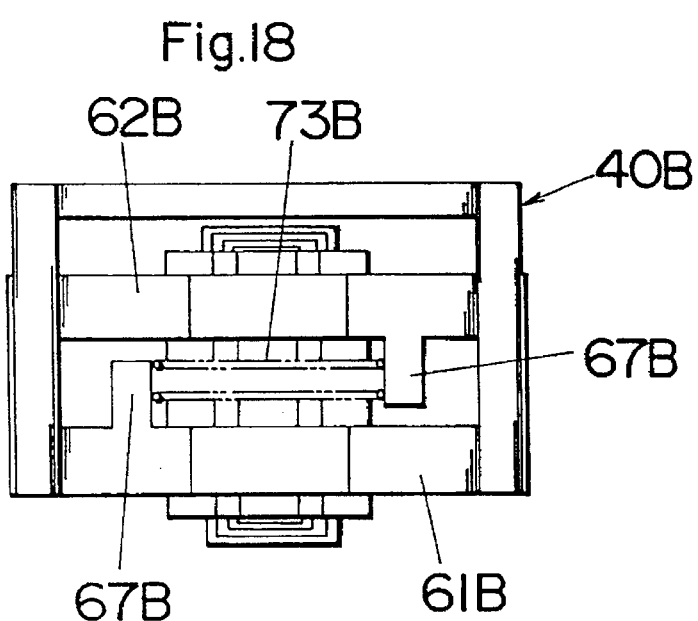
FIG 18 is a top view of the cutter block of FIG. 17 with movable cutters removed therefrom.

Third Embodiment< FIGS. 17 and 18>

FIG. 17 illustrates a cutter block 40B utilized in the dry shaver in accordance with a third embodiment of the present invention. The cutter block 40B is identical to the cutter head 40 in the first embodiment except that a single coil spring 73B is utilized commonly to the two oscillation systems of the reciprocators 61B and 62B. Like parts are designated by like numerals with a suffix letter of "B". In this embodiment, the reciprocators 61B and 62B are formed respectively with inwardly projecting end posts 67B between which the coil spring 73B is fitted, as shown in FIG. 18. The coil spring 73B give a spring constant which is additive to that of the leaf springs 71B and 72B as well as the horizontal component of the motor to provide a force constant K1 and K2 for the two oscillating systems.

Figure 19:
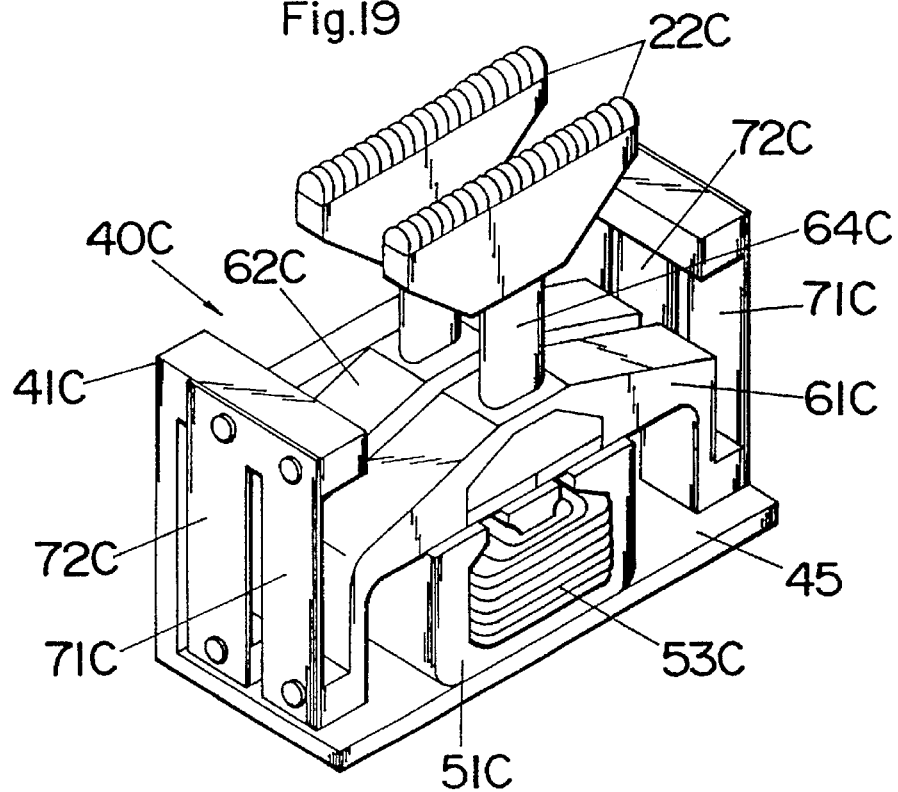
FIG. 19 is a perspective view of a cutter block utilized in a dry shaver in accordance with a fourth embodiment of the present invention.
Figure 20:
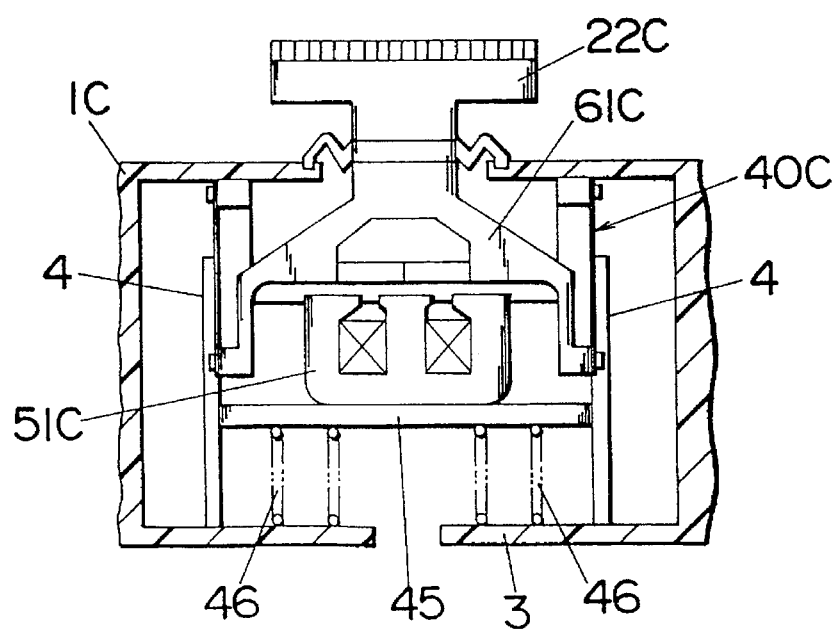
FIG. 20 is a schematic view illustrating the cutter block of FIG. 19 as mounted in a shaver housing.

Fourth Embodiment<FIGS. 19 and 20>

FIGS. 19 and 20 illustrates a cutter block 40C utilized in a dry shaver in accordance with a fourth embodiment of the present invention. The cutter block 40C is identical to that of the first embodiment except that a chassis 41C has a base plate 45 on which a like electromagnet 51C is mounted. The cutter block 40C is floatingly mounted within a housing 1C by interposing springs 46 between the base plate 45 and a bottom inctuber 3 in the head portion of the housing 1C such that the springs 46 give a bias for pressing the movable cutter 22C against the stationary cutter (not shown) of the cutter head. Guides 4 are provided in the housing 1C to allow the cutter block 40C to smoothly move vertically. With this configuration, the joints 64C are not required to have springs for biasing the movable cutters 22C. Like parts are designated by like numerals with a suffix letter of "C".

Fifth Embodiment<FIG. 21>

FIG. 21 illustrates a cutter block 40D utilized in a dry shaver in accordance with a fifth embodiment which is identical to that of the first embodiment except that a chassis has a base plate 45D on which a like electromagnet 51D is mounted and that leaf springs 71D and 72D extends horizontally for supporting reciprocators 61D and 62D to the base plate 45D. The base plate 45D is provided with four studs 47 projecting upwardly in a laterally spaced relation to the lengthwise ends of the corresponding reciprocators 61D and 62D. The leaf springs 71D and 72D extends horizontally from the upper ends of the studs 47 to the lengthwise ends of the reciprocators 61D and 62D so that the reciprocators are allowed to move strictly in a horizontal plane by flexing the springs, thereby exactly keeping a constant gap between like permanent magnets 54D and 55D in the bottom of the reciprocators and the opposing end poles of the electromagnet 51D. Like parts are designated by like numerals with a suffix letter of "D".

Although in the above embodiment a motor with a single stator, i.e., electromagnet and a plurality of reciprocators is utilized, it is equally possible to utilize a plurality of like motors each comprising a like stator, i.e., electromagnet and a reciprocator with a set of like permanent magnets. Each reciprocator carries each of like movable cutters so that each movable cutter is driven by each corresponding one of the motors. In this instance, a corresponding number of the detectors are provided to give individual outputs indicative of the speed of the individual movable cutters. Based upon these separate outputs from the detectors, a controller controls vary the individual electric power being fed to the individual motors for keeping the oscillation amplitude of the movable cutters at constant.

What is claimed is:

1. A reciprocatory dry shaver comprising:

a stationary cutter;

a movable cutter;

a permanent-magnet linear motor having a stator and a reciprocator which is driven by an electric current to reciprocate relative to said stator, said reciprocator carrying said movable cutter to reciprocate said movable cutter in shearing engagement with said stationary cutter; and a power supply providing an electric power to said motor; wherein a detector is provided to detect a displacement of the movable cutter and give an output indicative of the detected displacement of said movable cutter, and wherein a controller is provided to vary said electric power being fed to said motor in a feedback manner based upon said output from said detector in order to keep an oscillation amplitude of said movable cutter at constant, wherein a plurality of said reciprocators are provided to carry individual ones of a plurality of said movable cutters, two adjacent ones of said reciprocators carrying two adjacent ones of said movable cutters being driven to move in the directions opposed to one another, at least one spring coupling said two adjacent reciprocators to establish an energy transmitting connection therebetween, thereby giving a force constant which determines a natural frequency for an oscillating system of each of the two adjacent ones of said movable cutters.

2. A reciprocatory dry shaver comprising:

a stationary cutter;

a movable cutter;

a permanent-magnet linear motor having a stator and a reciprocator which is driven by an electric current to reciprocate relative to said stator, said reciprocator carrying said movable cutter to reciprocate said movable cutter in shearing engagement with said stationary cutter; and a power supply providing an electric power to said motor; wherein a detector is provided to detect a displacement of the movable cutter and give an output indicative of the detected displacement of said movable cutter, and wherein a controller is provided to vary said electric power being fed to said motor in a feedback manner based upon said output from said detector in order to keep an oscillation amplitude of said movable cutter at constant, and wherein said detector gives said output in each half cycle of the oscillation of said reciprocating movable cutter, said controller responding to said output for varying said electric power.

3. A reciprocatory dry shaver as set forth in claim 2, wherein said detector detects a speed of said movable cutter as representative of the displacement of said movable cutter.

4. A reciprocatory dry shaver as set forth in claim 3, wherein a plurality of said reciprocators are provided in association with one said stator, said reciprocators carrying a plurality of said movable cutters, respectively to define therewith individual oscillation systems having individual masses ($M_1$; $M_2$) and individual force constants ($K_1$; $K_2$), and wherein a ratio of said force constant to said mass for one of said oscillation system is made approximately equal to that for the other oscillation system.

5. A reciprocatory dry shave as set forth in claim 4, wherein said oscillation systems have masses equal to each other.

6. A reciprocatory dry shaver as set forth in claim 4, wherein said stator comprises an electromagnet and each of said reciprocators comprises an permanent magnet, at least two of said reciprocators having said permanent magnets of different magnetic intensity so that the corresponding oscillation systems have different force constants.

7. A reciprocatory dry shaver as set forth in claim 4, wherein said stator comprises an electromagnet and each of said reciprocators comprises an permanent magnet, two adjacent said reciprocators having said permanent magnets of opposite polarity so that the corresponding movable cutters reciprocate in opposite directions.

8. A reciprocatory dry shaver comprising:

a stationary cutter;

a movable cutter;

a permanent-magnet linear motor having a stator and a reciprocator which is driven by an electric current to reciprocate relative to said stator, said reciprocator carrying said movable cutter to reciprocate said movable cutter in shearing engagement with said stationary cutter; and a power supply providing an electric power to said motor; wherein a detector is provided to detect a displacement of the movable cutter and give an output indicative of the detected displacement of said movable cutter, wherein a controller is provided to vary said electric power being fed to said motor in a feedback manner based upon said output from said detector in order to keep an oscillation amplitude of said movable cutter at constant, and wherein said controller provides a pulsating electric current at a constant level to deliver said electric power to the motor and controls a pulse width of said pulsating electric current for varying said electric power.

9. A reciprocatory dry shaver as set forth in claim 8, wherein said controller delivers said pulsating electric current in the form of an alternating pulse.

10. A reciprocatory dry shaver as set forth in claim 8, wherein said controller delivers said pulsating electric current over a period within which said movable cutter reaches a maximum speed.

11. A reciprocatory dry shaver as set forth in claim 8, wherein a plurality of said reciprocators are provided in association with one said stator, each of said reciprocators carrying said movable cutter, wherein a plurality of said detectors are provided to give individual outputs indicative of the displacements of the movable cutters, and wherein means is included to give an average of the said individual outputs as indicative of the averaged displacement of said movable cutters, said controller controlling to vary said electric power being fed to said motor based upon said averaged output for keeping an individual oscillation amplitude of said movable cutters at constant.

12. A reciprocatory dry shaver as set forth in claim 8, wherein a plurality of said motors are included to provide a plurality of said stators and a plurality of said reciprocators each carrying said movable cutter, and wherein a plurality of said detectors are provided to give individual outputs indicative of the speed of the movable cutters, said controller controlling to separately vary said electric power being fed to the individual motors based upon the corresponding outputs from said detectors for keeping the individual oscillation amplitude of said movable cutters at constant.

13. A reciprocatory dry shaver as set forth in claim 8, wherein a plurality of said reciprocators are provided to carry individual ones of a plurality of said movable cutters and a plurality of said detectors are provided, at least one of said detectors being provided to give the output indicative of the displacement of at least one associated movable cutter, said controller responding to said output from at least one said detector to vary the said electric power being fed to said motor for keeping the oscillation amplitude of at least one associated said movable cutter at constant.

14. A reciprocatory dry shaver as set forth in claim 8, further comprising a chassis for fixedly supporting said stator and for movably supporting said reciprocator through a supporting member which allows said reciprocator to reciprocate only along one horizontal axis relative to said stator and in an out of contact relation to said stator.

15. A reciprocatory dry shaver as set forth in claim 14, wherein said supporting member is a leaf spring.

16. A reciprocatory dry shaver comprising:
a stationary cutter;
a movable cutter;
a permanent-magnet linear motor having a stator and a reciprocator which is driven by an electric current to reciprocate relative to said stator, said reciprocator carrying said movable cutter to reciprocate said movable cutter in shearing engagement with said stationary cutter; and
a power supply providing an electric power to said motor; wherein a detector is provided to detect a displacement of the movable cutter and give an output indicative of the detected displacement of said movable cutter, wherein a controller is provided to vary said electric power being fed to said motor in a feedback manner based upon said output from said detector in order to keep an oscillation amplitude of said movable cutter at constant, and wherein said controller provides a pulsating electric current at a fixed pulse width to deliver said electric power to the motor, and controls a level of said pulsating electric current for varying said electric power.

17. A reciprocatory dry shaver as set forth in claim 6, wherein a plurality of said reciprocators are provided in association with one said stator, said reciprocators carrying a plurality of said movable cutters, respectively to define therewith individual oscillation systems having individual masses ($M_1$;$M_2$) and individual force constants ($K_1$;$K_2$), wherein a ration of said force constant to said mass for one of said oscillation system is made approximately equal to that for the other oscillation system.

18. A reciprocatory dry shaver comprising:
a stationary cutter;
a movable cutter;
a permanent-magnet linear motor having a stator and a reciprocator which is driven by an electric current to reciprocate relative to said stator, said reciprocator carrying said movable cutter to reciprocate said movable cutter in shearing engagement with said stationary cutter; and
a power supply providing an electric power to said motor; wherein a detector is provided to detect a speed of said movable cutter as representative of a displacement of the movable cutter and give an output indicative of the detected displacement of said movable cutter, wherein a controller is provided to vary said electric power being fed to said motor in a feedback manner based upon said output from said detector in order to keep an oscillation amplitude of said movable cutter at constant, and wherein said detector comprises a permanent magnet secured to said movable cutter and a coil which is juxtaposed to said permanent magnet for generating an induction voltage proportional to the speed of said movable cutter, said coil being mounted within a wall of a frame surrounding said movable cutter, said wall being parallel to the reciprocation movement of said movable cutter.

19. A reciprocatory dry shaver as set forth in claim 18, wherein said coil is mounted in a chassis which supports said motor.

20. A reciprocatory dry shaver comprising:
a stationary cutter;
a movable cutter;
a permanent-magnet linear motor having a stator and a reciprocator which is driven by an electric current to reciprocate relative to said stator, said reciprocator carrying said movable cutter to reciprocate said movable cutter in shearing engagement with said stationary cutter; and
a power supply providing an electric power to said motor; wherein a detector is provided to detect a speed of said movable cutter as representative of a displacement of the movable cutter and give an output indicative of the detected displacement of said movable cutter, wherein a controller is provided to vary said electric power being fed to said motor in a feedback manner based upon said output from said detector in order to keep an oscillation amplitude of said movable cutter at constant, and wherein said detector comprises a magnetic sensor generating said output in response to change of a varying magnetic field caused by the movement of said movable cutter.

21. A reciprocatory dry shaver comprising:

a stationary cutter;

a movable cutter;

a permanent-magnet linear motor having a stator and a reciprocator which is driven by an electric current to reciprocate relative to said stator, said reciprocator carrying said movable cutter to reciprocate said movable cutter in shearing engagement with said stationary cutter; and a power supply providing an electric power to said motor; wherein a detector is provided to detect a displacement of the movable cutter and give an output indicative of the detected displacement of said movable cutter, wherein a controller is provided to vary said electric power being fed to said motor in a feedback manner based upon said output from said detector in order to keep an oscillation amplitude of said movable cutter at constant, and wherein said detector comprises a photo sensor generating said output in response to varying reflecting light beam from said movable cutter.

22. A reciprocatory dry shaver comprising:

a stationary cutter;

a movable cutter;

a permanent-magnet linear motor having a stator and a reciprocator which is driven by an electric current to reciprocate relative to said stator, said reciprocator carrying said movable cutter to reciprocate said movable cutter in shearing engagement with said stationary cutter; and a power supply providing an electric power to said motor; wherein a detector is provided to detect a speed of said movable cutter as representative of a displacement of the movable cutter and give an output indicative of the detected displacement of said movable cutter, wherein a controller is provided to vary said electric power being fed to said motor in a feedback manner based upon said output from said detector in order to keep an oscillation amplitude of said movable cutter at constant, and wherein said detector comprises an acceleration sensor for detection of an acceleration of said movable cutter and integrator means for integrating the detected acceleration to give said speed.

23. A reciprocatory dry shaver comprising:

a stationary cutter;

a movable cutter;

a permanent-magnet linear motor having a stator and a reciprocator which is driven by an electric current to reciprocate relative to said stator, said reciprocator carrying said movable cutter to reciprocate said movable cutter in shearing engagement with said stationary cutter; and a power supply providing an electric power to said motor; wherein a plurality of said reciprocators are provided to carry individual ones of a plurality of said movable cutters, two adjacent ones of said reciprocators being driven to move in the directions opposed to one another, at least one spring couping held between said two adjacent reciprocators to establish an energy transmitting connection therebetween, thereby giving a force constant which determines a natural frequency for an oscillating system of each of the two adjacent movable cutters.

24. A reciprocatory dry shaver comprising:

a stationary cutter;

a movable cutter;

a permanent-magnet linear motor having a stator and a reciprocator which is driven by an electric current to reciprocate relative to said stator, said reciprocator carrying said movable cutter to reciprocate said movable cutter in shearing engagement with said stationary cutter;

a power supply providing an electric power to said motor; and a chassis for fixedly supporting said stator and for movably supporting said reciprocator through a pair of leaf springs so as to allow said reciprocator to reciprocate only along a horizontal axis relative to said stator in an out of contact relation thereto, each of said leaf springs having an upper end fixed to said chassis and having a lower end fixed to the reciprocator so that said reciprocator is suspended from said chassis in an opposing relation to said stator.

* * * * *